(12) United States Patent
Chowdhry

(10) Patent No.: US 8,813,175 B2
(45) Date of Patent: Aug. 19, 2014

(54) MULTIMODAL COMPUTING DEVICE

(75) Inventor: Tripatinder Chowdhry, El Granada, CA (US)

(73) Assignee: Empire Technology Development LLC, Wilmington, DE (US)

( * ) Notice: Subject to any disclaimer, the term of this patent is extended or adjusted under 35 U.S.C. 154(b) by 44 days.

(21) Appl. No.: 13/498,424

(22) PCT Filed: Aug. 15, 2011

(86) PCT No.: PCT/US2011/047756
§ 371 (c)(1),
(2), (4) Date: Mar. 27, 2012

(87) PCT Pub. No.: WO2013/025196
PCT Pub. Date: Feb. 21, 2013

(65) Prior Publication Data
US 2013/0074067 A1 Mar. 21, 2013

(51) Int. Cl.
*G06F 21/00* (2013.01)
*H04L 29/06* (2006.01)
(52) U.S. Cl.
USPC ............. 726/1; 718/1; 455/418; 709/203; 709/250; 713/323; 725/78
(58) Field of Classification Search
USPC ........... 726/1; 718/1; 455/418; 709/203, 250; 725/78; 713/323
See application file for complete search history.

(56) References Cited

U.S. PATENT DOCUMENTS

2007/0266409 A1* 11/2007 Hsu ................................. 725/78
2008/0155125 A1* 6/2008 Karstens ...................... 709/250
2008/0201414 A1* 8/2008 Amir Husain et al. ........ 709/203
2009/0325562 A1* 12/2009 Hough et al. .................. 455/418
2010/0115315 A1* 5/2010 Davis et al. .................... 713/323

FOREIGN PATENT DOCUMENTS

JP  2009093601 A  *  4/2009

OTHER PUBLICATIONS

Owen S. Hofmann, Sangman Kim, Alan M. Dunn, Michael Z. Lee, Emmett Witchel; "InkTag: secure applications on an untrusted operating system"; Apr. 2013; ASPLOS '13: Proceedings of the eighteenth international conference on Architectural support for programming languages and operating systems; Publisher: ACM; pp. 265-278.*
International Search Report and Written Opinion dated Jan. 5, 2012 in PCT/US11/47756.
Apple iPad 2, http://www.apple.com/ipad/ Accessed Jan. 10, 2012.

(Continued)

*Primary Examiner* — Hadi Armouche
*Assistant Examiner* — Courtney Fields
(74) *Attorney, Agent, or Firm* — Hope Baldauff, LLC

(57) ABSTRACT

Technologies described herein generally provide a multimodal device capable of providing at least dual usage. In an example, the multimodal device may include base hardware and a hypervisor that runs on the base hardware. A work virtual machine may include a work operating system that is configured to operate on the hypervisor. A home virtual machine may include a home operating system that is configured to operate on the hypervisor. The work virtual machine may further include an arbitrator operating system that is configured to operate on hypervisor. The arbitrator operating system may be configured to run a smart arbitrator server. The smart arbitrator server may be configured to provide a gateway between the work virtual machine and the home virtual machine. The smart arbitrator server may also be configured to enforce various policies between the work virtual machine and the home virtual machine.

24 Claims, 6 Drawing Sheets

(56) References Cited

OTHER PUBLICATIONS

Apple, iPhone OS Enterprise Deployment Guide, Second Edition, for Version 3.2 or later, 2010.

Churchill, Sam, "Telecom: Big Bucks to Lobby Congress," posted Jan. 4, 2011 http://www.dailywireless.org/2011/01/04/telecom-big-bucks-to-lobby-congress/ Accessed Oct. 26, 2011.

Crump, George, "Tablets and Desktop Virtualization," Sep. 23, 2010 http://www.networkcomputing.com/virtualization/229501135 Accessed Feb. 1, 2011.

Ou, George, "Introduction to Server Virtualization," May 22, 2006 http://www.techrepublic.com/article/introduction-to-server-virtualization/6074941 Accessed Jan. 10, 2012.

Samsung, Galaxy S II, http://www.samsung.com/global/microsite/galaxys2/html/ Accessed Jan. 10, 2012.

Shah, Agam, "Virtualization to Supercharge New Tablets, Smartphones," Sep. 29, 2010 http://www.pcworld.com/businesscenter/article/206571/virtualization_to_supercharge_new_tablets_smartphones.html Accessed Feb. 1, 2011.

Toshiba Tegra 2 Android Tablet (CES 2011), Jan. 7, 2011 http://walyou.com/toshiba-tegra-2-ces/ Accessed Jan. 10, 2012.

Wikipedia, x86 Virtualization, http://en.wikipedia.org/wiki/X86_virtualization Accessed Jan. 10, 2012.

Ziegler, Chris, "Work, Play on a Single Phone: LD Teams up with VIVIware to Deploy Android Handsets with Virtualization," Dec. 7, 2010, http://www.engadget.com/2010/12/07/work-play-on-a-single-phone-Ig-teams-up-with-vmware-to-deploy/ Accessed Feb. 1, 2011.

* cited by examiner

MULTIMODAL COMPUTING DEVICE

BACKGROUND

Unless otherwise indicated herein, the materials described in this section are not prior art to the claims in this application and are not admitted to be prior art by inclusion in this section.

Tablet computing devices (hereinafter referred to as "tablets") have increased in popularity in recent years for both personal use and business use. A user may carry a single tablet for both personal use and business use. However, personal use goals and business use goals may differ. Personal use goals are typically defined by the user. For example, the user may desire freedom to install games and social networking applications on the tablet. The user may also desire privacy with respect to personal data stored on the tablet. Business use goals are typically defined by an enterprise. For example, the enterprise may desire to control the applications installed on the tablet. The enterprise may also desire access to applications and business data on the tablet.

To address these conflicting goals between personal use and business use, the user may instead carry two tablets at any given time—one tablet for personal use and another tablet for business use. However, carrying more than one tablet can be cumbersome and inconvenient. Further, each tablet may be associated with a separate service plan, thereby incurring additional costs.

SUMMARY

The present disclosure generally describes a multimodal device configured to provide at least dual usage. Some example multimodal devices may include base hardware, a hypervisor, a work virtual machine, a home virtual machine, an arbitrator operating system, and a smart arbitrator server. The base hardware may include a processor and a memory coupled to the processor. The hypervisor may be configured to operate on the base hardware. The hypervisor may be adapted to allocate resources of the base hardware between multiple operating systems. The work virtual machine may include a work operating system configured to operate on the hypervisor. The work operating system may be adapted to run work applications installed on the work virtual machine. The home virtual machine may include a home operating system configured to operate on the hypervisor. The home operating system may be adapted to run home applications installed on the home virtual machine. The arbitrator operating system may be configured to operate on the hypervisor. The smart arbitrator server may be configured to operate on the arbitrator operating system. The smart arbitrator server may be adapted to provide a gateway between the work virtual machine and the home virtual machine, manage access to the work applications according to a policy, and manage access to the home applications according to the policy. The policy may differ between access to the work applications and access to the home applications.

The present disclosure generally also describes techniques for arbitrating a multimodal device having a bare metal hypervisor configured to operate on base hardware. Some example methods may include providing a work virtual machine including a work operating system configured to operate on the bare metal hypervisor. The work operating system may be adapted to run work applications installed on the work virtual machine Example methods may include providing a home virtual machine including a home operating system configured to operate on the bare metal hypervisor. The home operating system may be adapted to run home applications installed on the home virtual machine Example methods may include providing a gateway between the work virtual machine and the home virtual machine. Example methods may also include managing access to the work applications according to a policy. Example methods may further include managing access to the home applications according to the policy. The policy may differ between access to the work applications and access to the home applications.

The present disclosure generally further describes a tablet computer adapted to provide at least dual usage. Some example tablet computers may include base hardware, a hypervisor, a work virtual machine, a home virtual machine, an arbitrator operating system, and a smart arbitrator server. The base hardware may include a processor and a memory coupled to the processor. The bare metal hypervisor may be configured to operate on the base hardware. The bare metal hypervisor may be adapted to allocate resources of the base hardware between multiple operating systems. The work virtual machine may include a work operating system configured to operate on the bare metal hypervisor. The work operating system may be adapted to run work applications installed on the work virtual machine and shared applications. The home virtual machine may include a home operating system configured to operate on the bare metal hypervisor. The home operating system may be adapted to run home applications installed on the home virtual machine and shared applications. The arbitrator operating system may be configured to operate on the bare metal hypervisor. The smart arbitrator server may be configured to operate on the arbitrator operating system. The smart arbitrator server may be adapted to provide a gateway between the work virtual machine and the home virtual machine, manage access to the work applications according to a policy, and manage access to the home applications according to the policy. The policy may differ between access to the work applications and access to the home applications.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
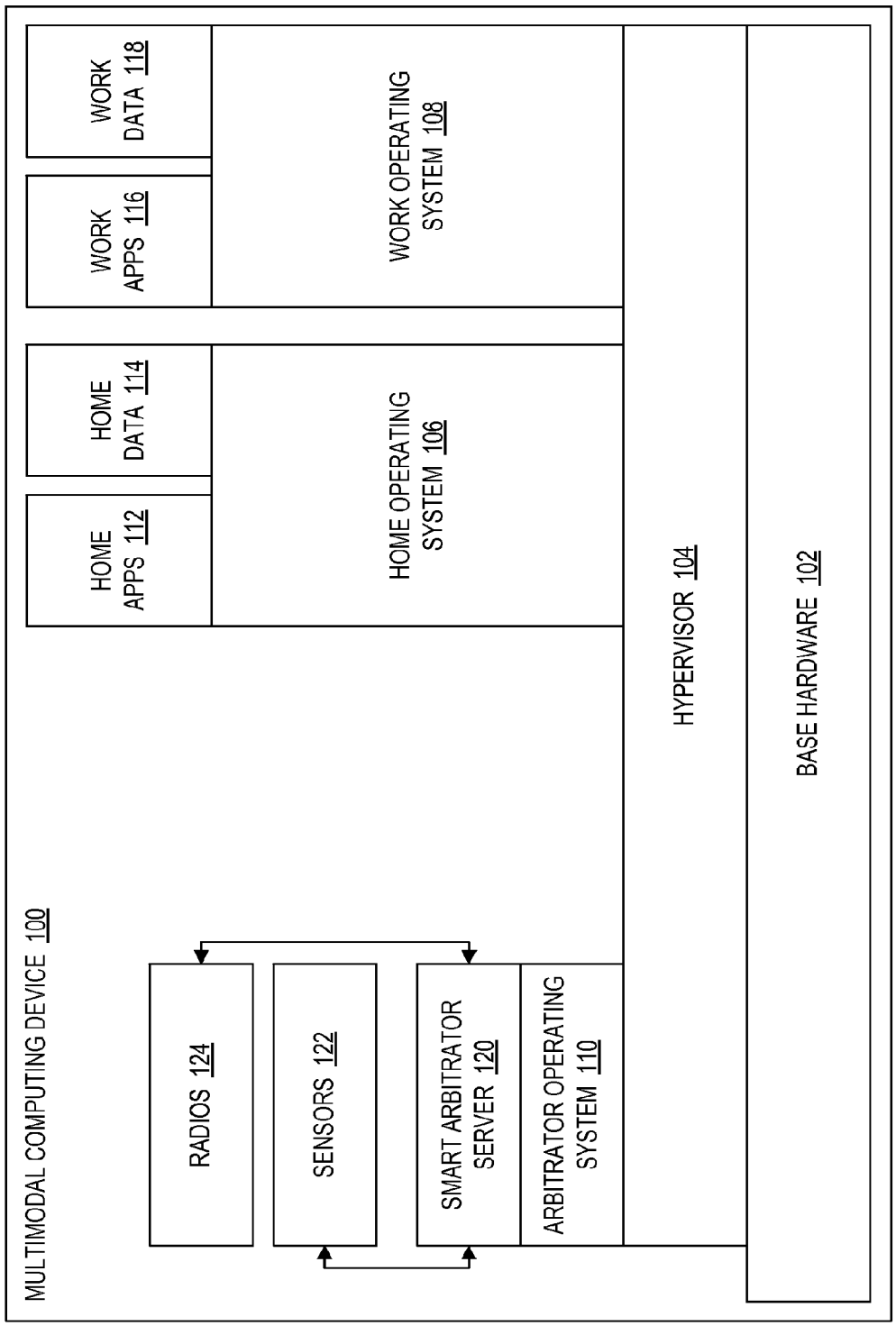
FIG. 1 is a functional block diagram illustrating an example multimodal computing device.

all arranged according to at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to a multimodal computing device configured to provide at least two self-contained, individually managed, and isolated environments. In some implementations, the multimodal computing device may be configured to operate in either one of and transition between two modes: a personal or home mode adapted to provide a home virtual machine and a work mode adapted to provide a work virtual machine. The home virtual machine may operate like a single modal computing device dedicated for personal use. For example, a user may have the same freedom over the selection and installation of applications on the home virtual machine as the user would have on a dedicated personal computing device. The work virtual machine may operate like a single modal computing device issued by an enterprise (e.g., the user's employer) to the user and dedicated for work use. For example, the enterprise may have the same control over the selection and installation of applications on the work virtual machine as the enterprise would have over a dedicated work-specific computing device.

FIG. 1 is a functional block diagram illustrating an example multimodal computing device 100, arranged in accordance with at least some embodiments presented herein. The multimodal computing device 100 may be implemented as a tablet, a smart phone, a laptop computer, an in-car computer, or other computing devices that have at least dual usage. The multimodal computing device 100 may include a base hardware 102 and a hypervisor 104 configured to run on the base hardware 102. The multimodal computing device 100 may also include a home operating system 106, a work operating system 108, and an arbitrator operating system 110, each of which are configured to run on the hypervisor 104. The home operating system 106 may be configured to run one or more home applications 112 and access home data 114. The work operating system 108 may be configured to run one or more work applications 116 and access work data 118. The arbitrator operating system 110 may be configured to run a smart arbitrator server 120. The multimodal computing device 100 may also include one or more sensors 122 and/or one or more radios 124.

The hypervisor 104 may be a bare metal hypervisor according to some embodiments. In a bare metal implementation, the hypervisor 104 may execute or run directly on the base hardware 102 without intervening software between the hypervisor 104 and the base hardware 102. The hypervisor 104 may be configured to manage and control access to processors, cache memory, main memory, and other shared resources of the base hardware 102. Through the hypervisor 104, multiple operating systems, including the home operating system 106, the work operating system 108, and the arbitrator operating system 110, can be installed and executed or ran on the same based hardware 102.

The home operating system 106 may be self-contained and isolated from the work operating system 108. The home operating system 106 may form a home virtual machine adapted for personal use scenarios. In the home virtual machine, the user or a user entity may have control of and unrestricted access to the home applications 112 and the home data 114. Some examples of the home applications 112 may include a photo viewing application, a navigation application, a music application, a social networking application, a movie viewing application, games, a personal backup application, or other personal applications associated with personal use scenarios. Some examples of the home data 114 may include personal photos, music, movies, or other personal data associated with personal use scenarios.

The work operating system 108 may be self-contained and isolated from the home operating system 106. The work operating system 108 may form a work virtual machine adapted for work use scenarios. In the work virtual machine, an information technology ("IT") manager or other authorized representative of an enterprise (also referred to as a non-user entity) may have control of and access to the work applications 116 and the work data 118. The IT manager may also restrict the user's access to the work applications 116 and/or the work data 118. Some examples of the work applications 116 may include an expense application, an enterprise email application, a customer relationship management application, an enterprise backup application, or other enterprise specific applications associated with work use scenarios. Some examples of the work data 118 may include expense data, client data, enterprise emails, or other enterprise specific data associated with work use scenarios.

The smart arbitrator server 120 may be configured to run on the arbitrator operating system 110. Whereas the home operating system 106 and the work operating system 108 may be more complete versions of a given operating system, the arbitrator operating system 110 may be a stripped-down version of the operating system. The smart arbitrator server 120 may be configured to perform a limited number of tasks. As a result, the arbitrator operating system 110 can be reduced to only those components utilized by the smart arbitrator server 120 to perform these tasks. In this way, the arbitrator operating system 110 can provide increased performance and reduced power consumption.

According to various embodiments, the multimodal computing device 100 may be configured to operate in either one of two modes: a home mode or a work mode. When the multimodal computing device 100 operates in the home mode, the multimodal computing device 100 may be configured to run the home operating system 106. From a user's perspective, the multimodal computing device 100 configured or operating in the home mode may operate like a single modal computing device dedicated for personal use. When the multimodal computing device 100 operates in the work mode, the multimodal computing device 100 may be configured to run the work operating system 108. From the user's perspective, the multimodal computing device 100 configured or operating in the work mode may operate like a single modal computing device issued by an enterprise to the user and dedicated for work use.

The smart arbitrator server 120 may serve as an intelligent gateway to either the home virtual machine or the work virtual machine. The smart arbitrator server 120 may be configured to provide the IT manager control over the work virtual machine. For example, the IT manager may restrict a user's access to the work applications 116 and the work data 118. The smart arbitrator server 120 may also be configured to provide flexibility in running applications on multiple devices. For example, the smart arbitrator server 120 may be configured to enable a user to pause an application running on the multimodal computing device 100 at a given state and then resume execution of the application on another computing device at the same state. The smart arbitrator server 120 may further be configured to manage power consumption by turning off or transitioning into standby mode at least a portion of the sensors 122 and/or the radios 124 that are not utilized. Additional details regarding the smart arbitrator server 120 are provided below with reference to FIG. 2.

Some examples of the sensors 122 may include a compass, a camera, a microphone, an accelerometer, a gyroscope, or a global positioning system ("GPS") receiver. Data obtained by the sensors 122 may be utilized by the home applications 112, the work applications 116, and/or other applications installed on the multimodal computing device 100. Some examples of the radios 124 may include a 3G radio configured to access 3G networks, a 4G radio configured to access 4G networks, a WI-FI radio configured to access WI-FI networks, or a BLUETOOTH radio configured to access BLUETOOTH networks. The radios 124 may enable the multimodal computing device 100 to communicate with other computing devices via various public and private networks as well as the Internet.

Figure 2:
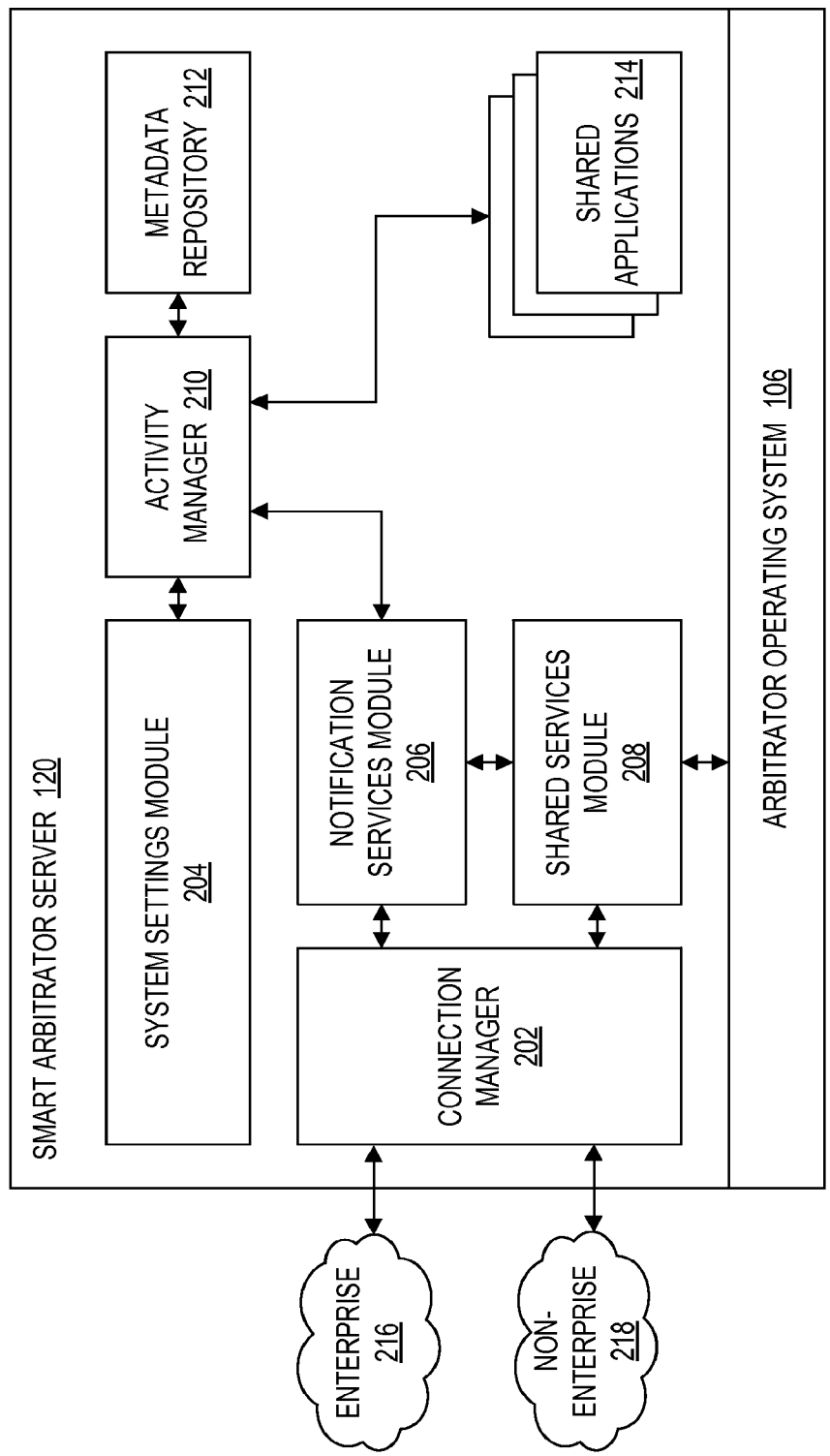
FIG. 2 is a functional block diagram illustrating an example implementation of the smart arbitrator server.

FIG. 2 is a functional block diagram illustrating an example implementation of the smart arbitrator server 120, arranged in accordance with at least some embodiments presented herein. The smart arbitrator server 120 may include a connection manager 202, a system settings module 204, a notification services module 206, a shared services module 208, an activity manager 210, a metadata repository 212, and one or more shared applications 214.

Some examples of applications installed and run on the multimodal computing device 100 may include the home applications 112, the work applications 116, and the shared applications 214. The home applications 112 may include personal applications associated with personal use scenarios. For example, the home applications 112 may include entertainment and game applications that would not be suitable for or in a work environment. The home applications 112 may be configured to access the home data 114. A user may run the home applications 112 when the multimodal computing device 100 operates in the home mode.

The user may have control of and unrestricted access to the home applications 112 and the home data 114. The IT manager may have no control of, access to, or visibility of the home applications 112 or the home data 114. In some embodiments, the user may access, via the activity manager 210, a publicly accessible application store and select certain home applications. The activity manager 210 may be configured to download the selected home applications from the publicly accessible application store and install the selected home applications on the home operating system 106. The publicly accessible application store may be associated with a platform of the multimodal computing device 100. Some examples of a publicly accessible application store associated with particular platforms may include APP STORE from APPLE, INC., ANDROID MARKET from GOOGLE, or WINDOWS PHONE MARKETPLACE from MICROSOFT.

The work applications 116 may include work applications associated with work use scenarios. For example, the work applications 116 may include enterprise applications where proprietary trade secrets or confidential client data is accessed. The work applications 116 may be configured to access the work data 118. A user may run the work applications 116 when the multimodal computing device 100 operates in the work mode.

The IT manager may have control of and access to the work applications 116 and the work data 118. The IT manager may define, via the activity manager 210, the level of access that the user has with respect to the work applications 116 and the work data 118. The IT manager may also define the particular work applications that can be installed on the multimodal computing device 100. In some embodiments, the IT manager may approve and provision, in a privately accessible application store, certain work applications that can be downloaded and installed on the multimodal computing device 100. The user or the IT manager may access, via the activity manager 210, the privately accessible application store. The activity manager 210 may be configured to download the provisioned work applications from the privately accessible application store and install the provisioned work applications on the work operating system 108. The privately accessible application store may be associated with the enterprise. The privately accessible application store may restrict access to certain users (e.g., employees or the enterprise). Also, the user may be restricted from accessing the privately accessible application store when the multimodal computing device 100 is in the home mode.

The shared applications 214 may include applications that are utilized by both the home operating system 106 and the work operating system 108. The IT manager may have control over the shared applications 214. The IT manager may define the particular shared applications that can be installed on the multimodal computing device 100. In some embodiments, the IT manager may approve and provision certain shared applications in the privately accessible application store that can be downloaded and installed on the multimodal computing device 100. The user or the IT manager may access, via the activity manager 210, the privately accessible application store. The activity manager 210 may be configured to download the provisioned shared applications from the privately accessible application store and install the provisioned shared applications on the multimodal computing device 100. Some examples of the shared applications 214 may include various utility applications (e.g., a clock application, a calculator application, etc.) as well as various productivity applications (e.g., a word processing application, a spreadsheet application, etc.). The shared applications 214 may be associated with separate home data and work data and/or shared data.

The activity manager 210 may be configured to install the shared applications 214 in different areas of the multimodal computing device 100 depending on whether the IT manager or the user initiates the installation. If the IT manager initiates the installation of a shared application, then the activity manager 210 may be configured to install the shared application on the smart arbitrator server 120 and/or the work operating system 108. If the user initiates the installation of a shared application, then the activity manager 210 may be configured to install the shared application on the home operating system 106. The IT manager may define, via the activity manager 210, whether the user is permitted to install a shared application. Some implementations may allow duplicate installations of the shared applications 214 on the smart arbitrator server 120, the home operating system 106, and/or the work operating system 108. The user may have greater control of installations of the shared applications 214 on the home operating system 106, while the IT manager may have greater control of installations of the shared applications 214 on the smart arbitrator server 120 or the work operating system 108.

At least some of the home applications 112 and/or the work applications 116 installed on the multimodal computing device 100 may be transferable applications. Other transferable applications may include streaming applications that are located entirely in the cloud (e.g., on a remote server computer), as well as hybrid applications where a portion of each transferable application is located in the cloud and another portion of each transferable application is located on the multimodal computing device 100. A user may pause a transferable application on a first computing device at a given state and then resume the transferable application on a second computing device at the same state. The first computing device and/or the second computing device may be the multimodal computing device 100. Additional details regarding transferable applications are provided below with reference to FIG. 3.

When an application developer creates an application, such as the home applications 112 and the work applications 116, the application developer may also create metadata associated with the application. The activity manager 210 may be configured to read the metadata associated with each installed application on the smart arbitrator server 120, the home operating system 106, and the work operating system 108. The activity manager 210 may be configured to create the metadata repository 212 and store the metadata in the metadata repository 212. The metadata associated with each application may include control information, configuration information, and/or location information associated with the application. The metadata associated with each application may also specify whether the application is a transferable application. For transferable applications, the associated metadata may also specify device types supported by a transferable application, an identity and location of a synchronization server adapted to perform the transfer, other information to effect the transfer, and/or state information. Additional details regarding transferable applications are provided in greater detail below with reference to FIG. 3.

The metadata may also specify which of the sensors 122 and/or the radios 124 that are utilized by each installed application. The activity manager 210 may be configured to maintain an inventory specifying the sensors 122 and the radios 124 present on the multimodal computing device 100. The activity manager 210 may also be configured to store the inventory in the metadata repository 212. The activity manager may further be configured to generate a map between the inventory and the metadata specifying which of the sensors 122 and which of the radios 124 are utilized by each installed application. As applications, sensors, and/or radios are added to and removed from the multimodal computing device 100, the activity manager 210 may be configured to update the metadata repository 212 accordingly. The activity manager 210 may be configured to maintain an application list specifying which of the applications are installed but not running, which of the applications are running and active (e.g., an application running in the foreground and exposed to the user), and/or which applications are running but are not active (e.g., an application running in the background and not exposed to the user).

The activity manager 210 may be configured to set a power level of each of the sensors 122 and/or each of the radios 124 according to one of three power settings: a default setting, an automatic setting, and a custom setting. In the default setting, the activity manager 210 may be configured to power on each of the sensors 122 and/or each of the radios 124. The sensors 122 and/or the radios 124 may be powered on irrespective of the particular applications that are installed or whether the installed applications are running and/or active.

In the automatic setting, the activity manager 210 may be configured to identify the sensors 122 and/or the radios 124 that are present on the multimodal computing device 100 based on the inventory. The activity manager 210 may be configured to turn off the sensors and/or the radios that are not utilized by the installed applications. The activity manager 210 may be configured to transition into a standby power mode the sensors and/or the radios that are utilized by the installed applications that are currently not running and/or applications that are running but are not active. The standby power mode may consume significantly less power than the power on mode. For example, the power on mode may be a full power mode, and the standby power mode may be a reduced power mode. The activity manager 210 may be configured to power on the sensors and/or the radios that are utilized by the installed applications and are currently running and active.

In the custom setting, the activity manager 210 may be configured to identify the sensors 122 and/or the radios 124 that are present on the multimodal computing device 100 based on the inventory. The activity manager 210 may be configured to turn off, transition into standby power mode, and/or power on each of the sensors 122 and/or each of the radios 124 based on user defined settings. The activity manager 210 may be configured to restrict the user from making certain changes. For example, the activity manager 210 may be configured to prevent a user from turning off a sensor and/or a radio that are utilized by an installed application and are currently running and active.

The IT manager may configure the multimodal computing device 100 when the IT manager has possession of the multimodal computing device 100. The IT manager may also configure the multimodal computing device 100 remotely. The IT manager may remotely connect to the multimodal computing device 100 via the connection manager 202. The connection manager 202 may be configured to authenticate the IT manager. When the IT manager has remotely connected to the multimodal computing device 100 via the connection manager 202, the IT manager may register various networks with the connection manager 202. A user may utilize these registered networks to communicate via an enterprise network 216 and one or more non-enterprise networks 218. The enterprise network 216 may refer to the enterprise's private network. The enterprise network 216 may be accessible via an enterprise WI-FI network or a virtual private network ("VPN"). The non-enterprise networks 218 may refer to personal networks associated with the user, publicly accessible networks, and/or other networks not associated with the enterprise. Some examples of the registered networks public may include 3G/4G networks and/or public WI-FI networks.

When the IT manager has remotely connected to the multimodal computing device 100 via the connection manager 202, the IT manager may also assign various policies to the work virtual machine. Some examples of policies, which are described in greater detail below, may include a synchronization policy, a security policy, and an access policy. The activity manager 210 may be configured to enforce these policies.

The activity manager 210 may be configured to manage the separation between the home virtual machine and the work virtual machine. The activity manager 210 may be configured to dictate that the enterprise has access to the work virtual machine but does not have access to the home virtual machine. The activity manager 210 may be configured to dictate that the enterprise can remotely access the work virtual machine via certain registered networks, such as an enterprise WI-FI network or a VPN. The activity manager 210 may be configured to allow the IT manager to lock down the work virtual machine so that the user does have access to the work virtual machine. During the lock down, the IT manager may utilize the activity manager 210 to perform compliance functions, auditing functions, upgrades, and/or maintenance of the work virtual machine.

The activity manager 210 may be configured to connect the work virtual machine and the home virtual machine to particular networks based on a location of the multimodal computing device 100. For example, the activity manager 210 may be configured to determine the location of the multimodal computing device 100 via a GPS receiver. The location of the multimodal computing device may indicate whether the user is at work or not at work.

If the user is at work, then the activity manager 210 may be configured to determine if an enterprise WI-FI network, as specified by the connection manager 202, is available. The enterprise WI-FI network may provide local access to the enterprise network 216. If the enterprise WI-FI network is available, then the activity manager 210 may be configured to connect, via the connection manager 202, the work virtual machine to the enterprise WI-FI network. If the enterprise WI-FI network is not available, then the activity manager 210 may be configured to connect, via the connection manager 202, the work virtual machine to a VPN using a 3G/4G network. The VPN may provide remote access to the enterprise network 216. The activity manager 210 may be configured to connect, via the connection manager 202, the home virtual machine to a public WI-FI network or a 3G/4G network.

If the user is not at work, then the activity manager 210 may be configured to determine if a WI-FI network is available. If the WI-FI network is available, then the activity manager 210 may be configured to connect, via the connection manager 202, the work virtual machine to a VPN using the WI-FI network. If the WI-FI network is available, then the activity manager 210 may also be configured to connect, via the connection manager 202, the home virtual machine to the WI-FI network. If the WI-FI network is not available, then the activity manager 210 may be configured to connect, via the connection manager 202, the work virtual machine to a VPN using a 3G/4G network. If the WI-FI network is not available, then the activity manager 210 may also be configured to connect, via the connection manager 202, the home virtual machine to the 3G/4G network.

The activity manager 210 may be configured to enforce a synchronization policy. In an illustrative implementation, an enterprise server may be configured to back up the work applications 116 and/or the work data 118. A user's personal computer may be configured to back up the home applications 112 and/or the home data 114. The synchronization policy may permit the enterprise server to back up the work applications 116 and/or the work data 118. The synchronization policy may restrict the enterprise server from backing up the home applications 112 and/or the home data 114. The synchronization policy may permit the user's personal computer to back up the home applications 112 and/or the home data 114. The synchronization policy may restrict the user's personal computer from backing up the work applications 116 and/or the work data 118.

The activity manager 210 may be configured to enforce a security policy. The security policy may permit the IT manager to perform configuration operations, backup operations, load operations, and/or unload operations on the work virtual machine. The security policy may restrict the IT from performing these same operations on the home virtual machine.

The activity manager 210 may be configured to activate the work virtual machine or the home virtual machine based on a location of the multimodal computing device 100 or the user's past behaviors. For example, the activity manager 210 may be configured to determine the location of the multimodal computing device 100 via a GPS receiver. The location of the multimodal computing device may indicate whether the user is at work or not at work. If the user is at work, then the activity manager 210 may be configured to activate the work virtual machine. If the user is not at work, then the activity manager 210 may be configured to activate the home virtual machine.

The activity manager 210 may be configured to display a welcome screen when the user initially accesses (e.g., turns on) the multimodal computing device 100. The welcome screen may be a graphical user interface that includes a work icon and a home icon. If the user is closer to work based on the location of the multimodal computing device 100, then the work icon may be shown larger than the home icon. If the user is farther away from work based on the location of the multimodal computing device 100, then the home icon may be shown as the same size as or larger than the work icon. If the user selects the work icon through the graphical user interface, then the activity manager 210 may be configured to activate the work virtual machine. If the user selects the home icon through the graphical user interface, then the activity manager 210 may be configured to activate the home virtual machine.

The system settings module 204 may be configured to enable to user to modify various system settings of the multimodal computing device 100. For example, under the current system settings, the microphone in the multimodal computing device 100 may be turned off. The user may utilize the system settings module 204 to turn on the microphone.

The notification services module 206 may be configured to provide various notifications to the user, the IT manager, and/or other devices. Some examples of notifications may include informational notifications (e.g., application has been installed, gyroscope has been stopped, etc.), actionable notifications (e.g., application has been paused and has been transferred to another device), or human intervention notifications (e.g., application crashed—need technical response, hardware crashed—need technical response, etc.) In some embodiments, the notification services module 206 may be utilized to implement transferable applications between the multimodal computing device 100 and other computing devices. Additional details regarding the notification services module 206 are provided below with reference to FIG. 3.

The shared services module 208 may be configured to provide various services that are shared by both the home operating system 106 and the work operating system 108. Some examples of shared services may include a clock time, backup services, or battery life. Some other examples of shared services may include global device controls, such as screen resolution or screen brightness.

In some embodiments, the activity manager 210, the notification services module 206, and/or the shared services module 208 may be programmable by the user and/or the IT manager. Thus, even after initial configuration of the activity manager 210, the notification services module 206, and/or the shared services module 208, the user and/or the IT manager may modify the activity manager 210, the notification services module 206, and/or the shared services module 208 to accommodate new use case scenarios.

Figure 3:
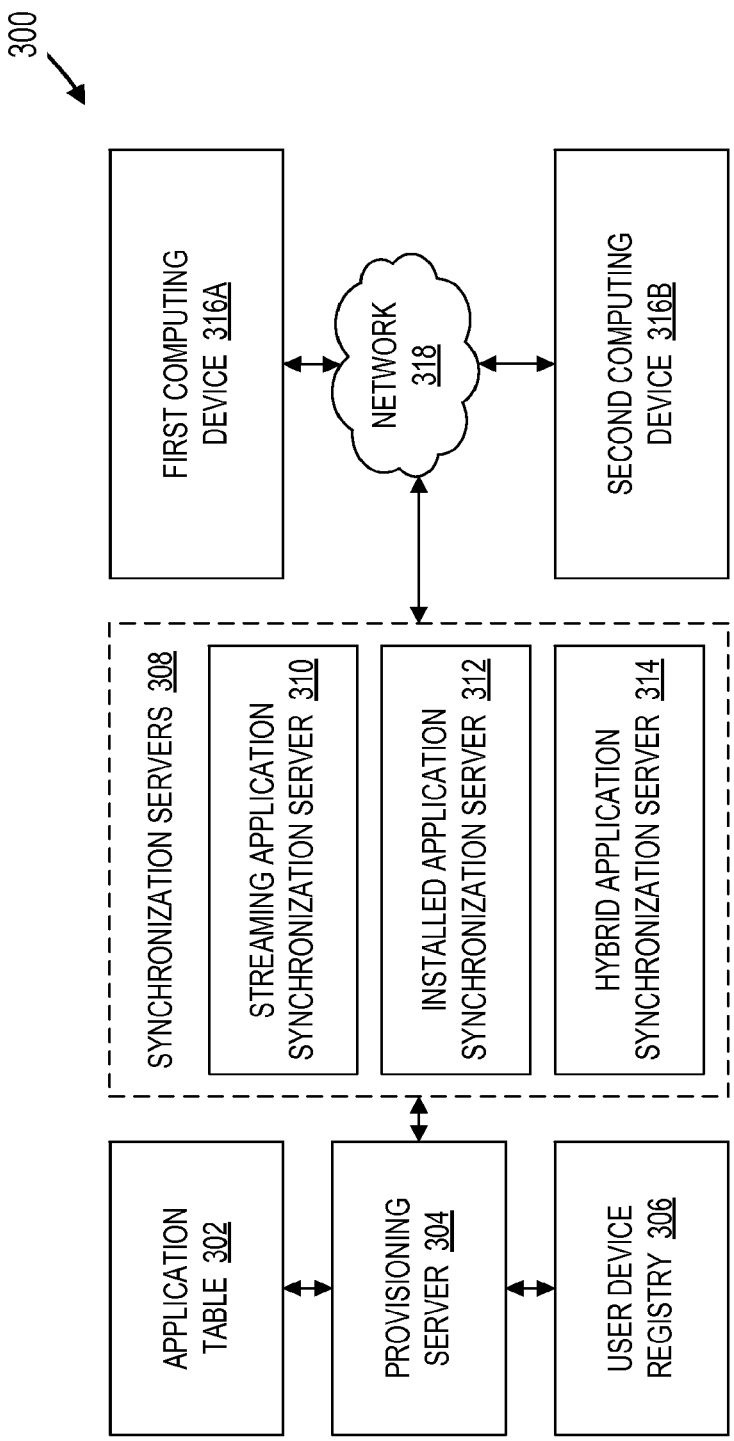
FIG. 3 is a functional block diagram illustrating an example enterprise cloud architecture adapted to implement transferable applications between multiple computing devices.

FIG. 3 is a functional block diagram illustrating an example enterprise cloud architecture 300 adapted to implement transferable applications between multiple computing devices, arranged in accordance with at least some embodiments presented herein. The enterprise cloud architecture 300 may include an application table 302, a provisioning server 304, a user device registry 306, and multiple synchronization servers 308. Some examples of the synchronization servers 308 may include a streaming application synchronization server 310, an installed application synchronization server 312, and a hybrid application synchronization server 314. The synchronization servers 308 may be coupled to a first computing device 316A and a second computing device 316B via a network 318. The first computing device 316A and the second computing device 316B may be collectively referred to as computing devices 316. The first computing device 316A and/or the second computing device 316B may be implemented as the multimodal computing device 100.

A user may register multiple computing devices through the user device registry 306. The application table 302 may include a list of applications and application attributes associated with each of the applications. The application attributes may include information specifying whether each application is a streaming application, an installed application, or a hybrid application. The provisioning server 304 may be configured to retrieve a list of the computing devices from the user device registry 306. The provisioning server 304 may be configured to retrieve metadata from the metadata repository, such as the metadata repository 212, associated with each of the computing devices.

The provisioning server 304 may be configured to identify the transferable applications based on the metadata. The provisioning server 304 may be configured to identify whether each transferable application a streaming application, an installed application, or a hybrid application based on the application attributes. Upon identifying the transferable applications and identifying the type of application based on the application attributes, the provisioning server 304 may be configured to associate one of the synchronization servers 308 to each transferable application depending on whether the transferable application is a streaming application, an installed application, or a hybrid application.

If the application attributes of a transferable application indicate that the transferable application is a streaming application, then the provisioning server 304 may be configured to assign the streaming application synchronization server 310 to the streaming application. A streaming application may refer to an application that resides entirely in the cloud. For example, the computing devices 316 may be configured to access the streaming application via a remote server computer.

In an illustrative implementation, a user may access a streaming application on the first computing device 316A. The user may then pause the streaming application. The activity manager 210 may be configured to transmit a notification that the streaming application is paused, a user identifier that identifies the user, an application identifier that identifies the streaming application (e.g., a name of the streaming application), and the state of the streaming application and the associated data at the time of the pause to the notification services module 206. The notification services module 206 may be configured to transmit, via the connection manager 202, the notification that the streaming application is paused, the user identifier, the application identifier, and the state to the streaming application synchronization server 310.

The second computing device 316B may be configured to submit the user identifier and the application identifier to the streaming application synchronization server 310. Upon receiving the user identifier and the application identifier to the streaming application synchronization server 310, the streaming application synchronization server 310 may be configured to retrieve the state of the streaming application and the associated data at the time of the pause. The streaming application synchronization server 310 may be configured to provide the state of the streaming application and the associated data at the time of the pause to the second computing device 316B. The second computing device 316B may be configured to resume the streaming application at the state of the streaming application and the associated data at the time of the pause.

In some embodiments, when the user pauses a streaming application, the activity manager 210 may be configured to provide the user with a graphical user interface having a drop-down list of computing devices. In particular, the drop-down list may include the computing devices registered in the user device registry 306. For example, the drop-down list may include an option to select the second computing device 316B. When the user selects the second computing device 316B via the drop-down list, the activity manager 210 may be configured to transmit a notification that the streaming application is paused and to restart the streaming application, an application identifier that identifies the streaming application, the state of the streaming application and the associated data at the time of the pause, and the device identifier that identifies the second computing device 316B. The notification services module 206 may be configured to transmit, via the connection manager 202, the notification that the streaming application is paused and to restart the streaming application, the application identifier, the state, and the device identifier to the streaming application synchronization server 310. The streaming application synchronization server 310 may be configured to instruct the second computing device 316B to restart the streaming application and resume the streaming application at the state of the streaming application and the associated data at the time of the pause. In this way, the second computing device 316B may automatically restart and resume the streaming application at the correct state without further user input.

If the application attributes of a transferable application indicate that the transferable application is an installed application, then the provisioning server 304 may be configured to assign the installed application synchronization server 310 to the installed application. An installed application may refer to an application that resides locally on the device. Some examples of installed applications may include the home applications 112 installed on the home virtual machine and the work applications 116 installed on the work virtual machine.

In an illustrative implementation, a user may access an installed application on the first computing device 316A. The user may then pause the installed application. The activity manager 210 may be configured to store the state of the installed application and the associated data in one or more files. For example, the state of the installed application may be stored in a control file, and the state of the associated data may be stored in a data file. The activity manager 210 may be configured to transmit a notification that the installed application is paused, a user identifier that identifies the user, an application identifier that identifies the installed application, and files to the notification services module 206. The notification services module 206 may be configured to transmit the notification that the installed application is paused, the user identifier, the application identifier, and the files to the installed application synchronization server 310.

The second computing device 316B may be configured to submit the user identifier and the application identifier to the installed application synchronization server 312. When the installed application synchronization server 312 receives the user identifier and the application identifier to the installed application synchronization server 310, the installed application synchronization server 310 may be configured to transmit the files to the second computing device 316B. The second computing device 316B may be configured to resume the installed application at the state of the installed application and the associated data at the time of the pause based on the files.

If the application attributes of a transferable application indicate that the transferable application is a hybrid application, then the provisioning server 304 may be configured to assign the hybrid application synchronization server 314 to the hybrid application. A hybrid application may refer to an application where a first part of the application resides in the cloud and a second part of the application resides locally on the device. That is, the hybrid application may be a combination of a streaming application and an installed application. In the case of hybrid applications, the hybrid application synchronization server 314 may be configured to implement the above processes described for the streaming application synchronization server 310 to handle the transfer of the first part of the hybrid application that resides in the cloud. The hybrid application synchronization server 314 may also be configured to implement the above processes described for the installed application synchronization server 312 to handle the transfer of the second part of the hybrid application that resides locally on the device.

Figure 4:
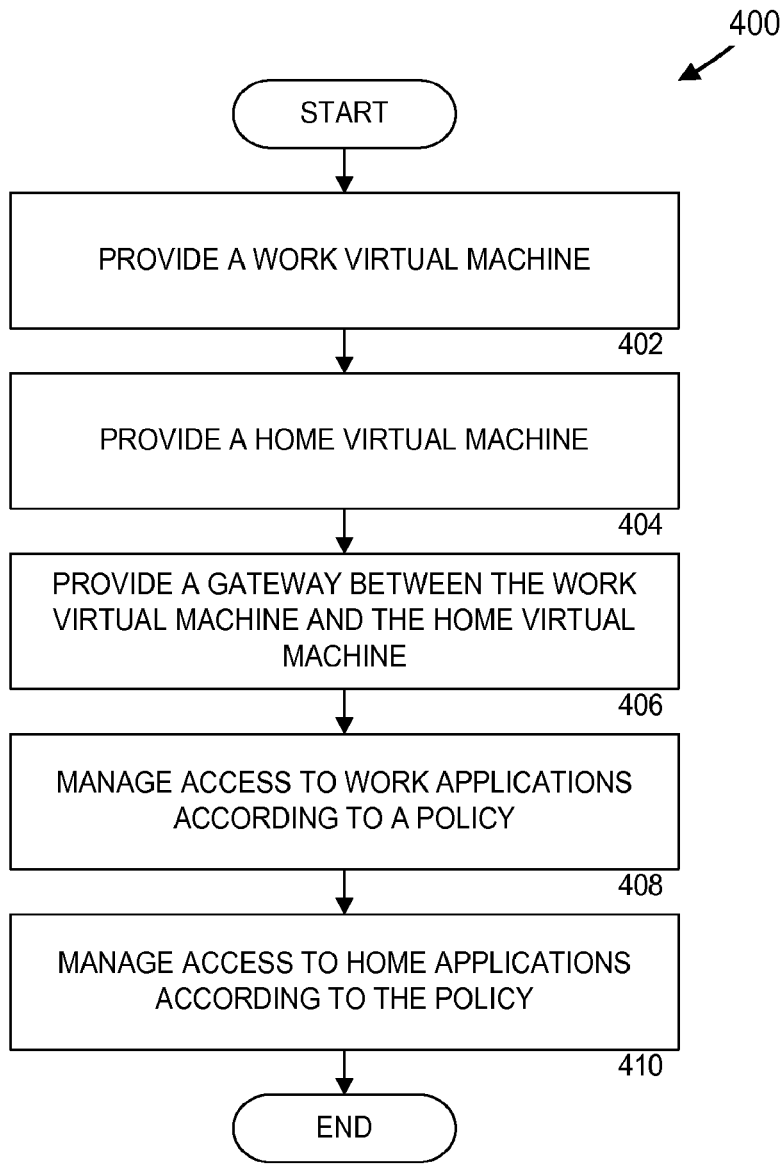
FIG. 4 is a flow diagram illustrating an example process 400 adapted to arbitrate a multimodal device.

FIG. 4 is a flow diagram illustrating an example process 400 adapted to arbitrate a multimodal device, arranged in accordance with at least some embodiments presented herein. The multimodal device, such as the multimodal computing device 100, may include a bare metal hypervisor configured to operate on base hardware. The process 400 may include various operations, functions, or actions as illustrated by one or more blocks 402 through 410.

The process 400 may begin at block 402 (Provide a Work Virtual Machine), where the multimodal device may be configured to include a work operating system. The work operating system may form work virtual machine. The work operating system may run on the bare metal hypervisor. The work operating system may be adapted to run work applications installed on the work operating system. Block 402 may be followed by block 404.

At block 404 (Provide a Home Virtual Machine), the multimodal device may be configured to include a home operating system. The home operating system may form the home virtual machine. The home virtual machine may be separate and isolated from the work virtual machine. The home operating system may run on the bare metal hypervisor. The home operating system may be adapted to run home applications installed on the home operating system. Block 404 may be followed by block 406.

At block 406 (Provide a Gateway between the Work Virtual Machine and the Home Virtual Machine), the multimodal device may be configured to include a smart arbitrator server. The smart arbitrator server may be adapted to serve as a gateway between the work virtual machine and the home virtual machine. The smart arbitrator server may be adapted to enforce various policies between the work machine and the home virtual machine. Some examples of policies may include synchronization policies, security policies, and access policies. Block 406 may be followed by block 408.

At block 408 (Provide Access to Work Applications According to a Policy), the smart arbitrator server may be configured to enforce an access policy as directed to the work virtual machine. For example, the access policy may permit a non-user entity, such as a representative of an enterprise, to install work applications retrieved from a privately accessible application store on the work virtual machine. The access policy may also restrict a user entity from installing home applications retrieved from a publicly accessible application store on the work virtual machine. Block 408 may be followed by block 410.

At block 410 (Provide Access to Home Applications According to the Policy), the smart arbitrator server may be configured to enforce the access policy as directed to the home virtual machine. For example, the access policy may permit a user entity to install home applications retrieved from a publicly accessible application store on the home virtual machine. The access policy may retrieve a non-user entity from installing work applications retrieved from a privately accessible application store on the home virtual machine. After block 410, the process 400 may either repeat (e.g., periodically, continuously, or on demand as needed) or terminate.

Figure 5:
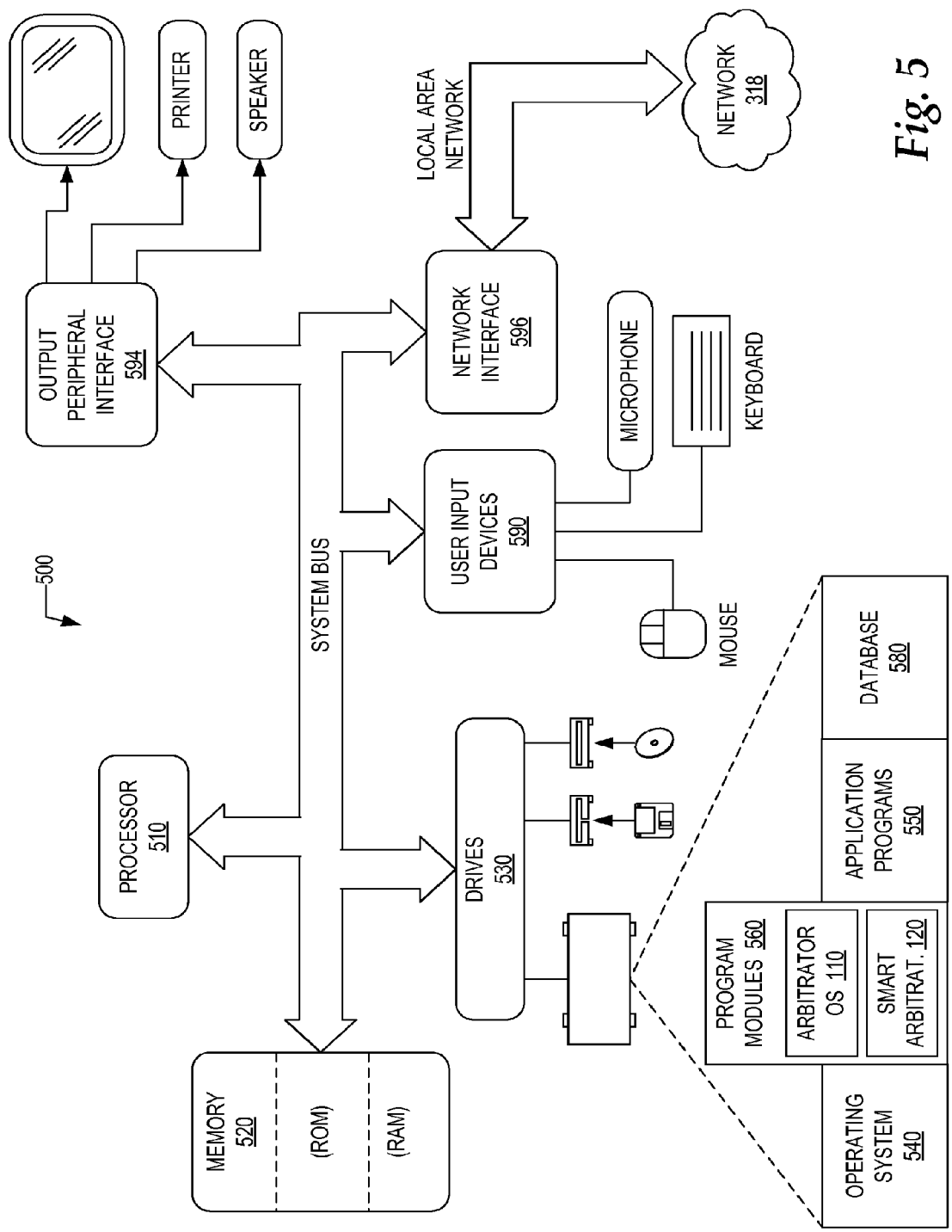
FIG. 5 is a block diagram illustrating a computer hardware architecture for an example computing system.

FIG. 5 is a block diagram illustrating a computer hardware architecture for an example computing system, arranged in accordance with at least some embodiments presented herein. FIG. 5 includes a computer 500, including a processor 510, memory 520, and one or more drives 530. The computer 500 may be implemented as a conventional computer system, an embedded control computer, a laptop, or a server computer, a mobile device, a set-top box, a kiosk, a vehicular information system, a mobile telephone, a customized machine, or other hardware platform.

The drives 530 and their associated computer storage media, provide storage of computer readable instructions, data structures, program modules and other data for the computer 500. The drives 530 can include an operating system 540, application programs 550, program modules 560, and a database 580. Some examples of the program modules 560 may include the arbitrator operating system 110 and the smart arbitrator server 120. Some other examples of the program modules 560 may include the home operating system 106 and the work operating system 108. The computer 500 further includes user input devices 590 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 510 through a user input interface that is coupled to a system bus, but may be coupled by other interface and bus structures, such as a parallel port, game port or a universal serial bus ("USB"). Computers such as the computer 500 may also include other peripheral output devices such as speakers, which may be coupled through an output peripheral interface 594 or the like.

The computer 500 may operate in a networked environment using logical connections to one or more computers, such as a remote computer coupled to a network interface 596. The remote computer may be a personal computer, a server, a router, a network PC, a peer device or other common network node, and can include many or all of the elements described above relative to the computer 500. Networking environments are commonplace in offices, enterprise-wide area networks ("WAN"), local area networks ("LAN"), intranets, and the Internet.

When used in a LAN or WLAN networking environment, the computer 500 may be coupled to the LAN through the network interface 596 or an adapter. When used in a WAN networking environment, the computer 500 typically includes a modem or other means for establishing communications over the WAN, such as the Internet or the network 318. The WAN may include the Internet, the illustrated network 318, various other networks, or any combination thereof. It will be appreciated that other mechanisms of establishing a communications link, ring, mesh, bus, cloud, or network between the computers may be used.

According to some embodiments, the computer 500 may be coupled to a networking environment. The computer 500 may include one or more instances of a physical computer-readable storage medium or media associated with the drives 530 or other storage devices. The system bus may enable the processor 510 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 520, whether characterized as RAM, ROM, flash, or other types of volatile or nonvolatile memory technology. The media may also represent secondary storage, whether implemented as the storage drives 530 or otherwise. Hard drive implementations may be characterized as solid state, or may include rotating media storing magnetically-encoded information.

The storage media may include one or more program modules 560. The program modules 560 may include software instructions that, when loaded into the processor 510 and executed, transform a general-purpose computing system into a special-purpose computing system. As detailed throughout this description, the program modules 560 may provide various tools or techniques by which the computer 500 may participate within the overall systems or operating environments using the components, logic flows, and/or data structures discussed herein.

The processor 510 may be constructed from any number of transistors or other circuit elements, which may individually or collectively assume any number of states. More specifically, the processor 510 may operate as a state machine or finite-state machine. Such a machine may be transformed to a second machine, or specific machine by loading executable instructions contained within the program modules 560. These computer-executable instructions may transform the processor 510 by specifying how the processor 510 transitions between states, thereby transforming the transistors or other circuit elements constituting the processor 510 from a first machine to a second machine. The states of either machine may also be transformed by receiving input from the one or more user input devices 590, the network interface 596, other peripherals, other interfaces, or one or more users or other actors. Either machine may also transform states, or various physical characteristics of various output devices such as printers, speakers, video displays, or otherwise.

Encoding the program modules 560 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 560 may transform the physical state of the semiconductor memory 520 when the software is encoded therein. For example, the software may transform the state of transistors, capacitors, or other discrete circuit elements constituting the semiconductor memory 520.

As another example, the storage media may be implemented using magnetic or optical technology such as drives 530. In such implementations, the program modules 560 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 6:
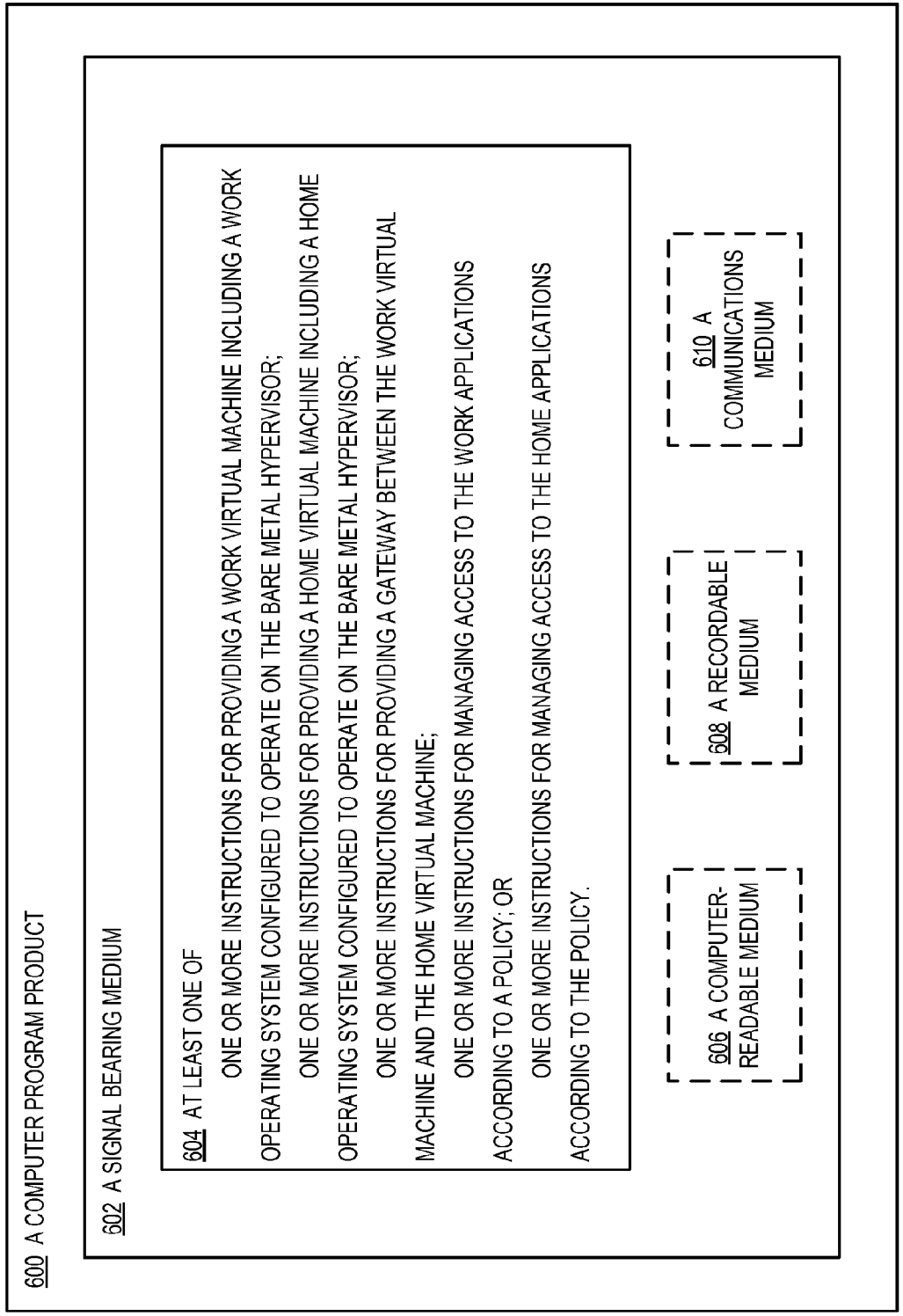
FIG. 6 is a schematic diagram illustrating a computer program product that includes a computer program for executing a computer process on a computing device.

FIG. 6 is a schematic diagram that illustrates a computer program product 600 that includes a computer program for executing a computer process on a computing device, arranged in accordance with at least some embodiments presented herein. An illustrative embodiment of the example computer program product is provided using a signal bearing medium 602, and may include at least one instruction of 604: one or more instructions for providing a work virtual machine including a work operating system configured to operate on the bare metal hypervisor; one or more instructions for providing a home virtual machine including a home operating system configured to operate on the bare metal hypervisor; one or more instructions for providing a gateway between the work virtual machine and the home virtual machine; one or more instructions for managing access to the work applications according to a policy; or one or more instructions for managing access to the home applications according to the policy. In some embodiments, the signal bearing medium 602 of the one or more computer program products 600 include a computer readable medium 606, a recordable medium 608, and/or a communications medium 610.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A multimodal device, comprising:
    base hardware comprising a processor and a memory coupled to the processor;
    a hypervisor configured to operate on the base hardware, the hypervisor adapted to allocate resources of the base hardware between multiple operating systems;
    a work virtual machine comprising a work operating system configured to operate on the hypervisor, the work operating system adapted to run work applications installed on the work virtual machine and shared applications;
    a home virtual machine comprising a home operating system configured to operate on the hypervisor, the home operating system adapted to run home applications installed on the home virtual machine and the shared applications that are utilized by the home operating system and the work operating system;
    an arbitrator operating system configured to operate on the hypervisor; and
    a smart arbitrator server configured to operate on the arbitrator operating system, the smart arbitrator server adapted to
    provide a gateway between the work virtual machine and the home virtual machine,
    manage access to the work applications according to a policy, wherein the policy allows a non-user entity to restrict a user entity from installing and removing the work applications on the work virtual machine,
    manage access to the home applications according to the policy, wherein the policy disallows the non-user entity to restrict the user entity from installing and removing the home applications on the home virtual machine,
    manage access to the shared applications according to the policy, wherein the policy allows the non-user entity to either restrict or allow the user entity from installing and removing the shared applications,
    receive an indication that an installed application from the work applications or the home applications is paused;
    store a state of the installed application and data associated with the installed application when the installed application was paused in a file; and transmit the file to an installed application synchronization server computer, the installed application synchronization server computer adapted to provide the file to another device to resume the installed application at the state.

2. The multimodal device of claim 1, wherein to manage access to the work applications according to the policy, the smart arbitrator server is further adapted to permit the non-user entity to install and remove the work applications on the work virtual machine and restrict the user entity from installing and removing the work applications on the work virtual machine; and wherein to manage access to the home applications according to the policy, the smart arbitrator server is further adapted to permit the user entity to install and remove the home applications in the home virtual machine and restrict the non-user entity from installing and removing the home applications in the home virtual machine.

3. The multimodal device of claim 2, wherein the smart arbitrator server is further adapted to:

receive from the non-user entity a request to remotely access the work virtual machine;

authenticate that the non-user entity is authorized to access the work virtual machine in response to the request; and permit the non-user entity to access the work virtual machine and restrict the non-user entity from accessing the home virtual machine when the non-user entity is authenticated.

4. The multimodal device of claim 2, wherein the policy specifies that one or more applications retrieved from a privately accessible enterprise application store are permitted to be installed on the work virtual machine and that one or more applications retrieved from a publicly accessible consumer application store are restricted from being installed on the work virtual machine; and wherein the policy specifies that one or more applications retrieved from the publicly accessible consumer application store are permitted to be installed in the home virtual machine and that one or more applications retrieved from the privately accessible enterprise application store are restricted from being installed in the home virtual machine.

5. The multimodal device of claim 4, wherein the policy further specifies that a select work application from the work applications installed on the work virtual machine is permitted to be installed on the home virtual machine and that other work applications from the work applications are restricted from being installed on the home virtual machine.

6. The multimodal device of claim 1, wherein to manage access to the work applications according to the policy, the smart arbitrator server is further adapted to permit data synchronization between the work virtual machine and a work server computer and restrict data synchronization between the work server computer and the home applications and home data; and wherein to manage access to the home applications according to the policy, the smart arbitrator server is further adapted to permit data synchronization between the home virtual machine and a home server computer and restrict data synchronization between the home server computer and the work applications and work data.

7. The multimodal device of claim 1, wherein to provide the gateway between the work virtual machine and the home virtual machine, the smart arbitrator server is further adapted to:

detect whether the multimodal device is within range of a home network;

activate the home virtual machine and connect to the home network when the multimodal device is determined to be within range of the home network;

detect whether the multimodal devices is within range of a work network; and activate the work virtual machine and connect to the work network when the multimodal device is determined to be within range of the work network.

8. The multimodal device of claim 1, wherein to provide the gateway between the work virtual machine and the home virtual machine, the smart arbitrator server is further adapted to:

provide a graphical user interface adapted to request a selection of the work virtual machine or the home virtual machine;

receive, via the graphical user interface, the selection of the work virtual machine or the home virtual machine;

activate the work virtual machine and connect to a work network when the selection of the work virtual machine is received; and activate the home virtual machine and connect to a home network when the selection of the home virtual machine is received.

9. The multimodal device of claim 1, wherein the multimodal device comprises a plurality of device sensors; and wherein the smart arbitrator server is further adapted to:

disable non-utilized devices sensors from the plurality of device sensors that are not utilized by the work applications and the home applications installed in the multimodal device;

enable in a reduced power mode a first set of utilized device sensors from the plurality of device sensors that are anticipated to be utilized by the work applications and the home applications installed in the multimodal device and are not currently utilized; and enable in a full power mode a second set of utilized device sensors from the plurality of device sensors that are anticipated to be utilized by the work applications and the home applications installed in the multimodal device and are currently utilized.

10. The multimodal device of claim 1, wherein the smart arbitrator server is further adapted to:

receive a second indication that a streaming application is paused; and transmit a second state of the streaming application and data associated with the streaming application when the streaming application was paused to a streaming application synchronization server computer, the streaming application synchronization server computer adapted to provide the second state to another device to resume the streaming application at the second state.

11. The multimodal device of claim 1, wherein the hypervisor comprises a bare metal hypervisor.

12. A method to arbitrate a multimodal device having a bare metal hypervisor configured to operate on base hardware, the method comprising:

providing a work virtual machine comprising a work operating system configured to operate on the bare metal hypervisor, the work operating system adapted to run work applications installed on the work virtual machine;

providing a home virtual machine comprising a home operating system configured to operate on the bare metal hypervisor, the home operating system adapted to run home applications installed on the home virtual machine;

providing a gateway between the work virtual machine and the home virtual machine;

managing access to the work applications according to a policy, wherein the policy allows a non-user entity to restrict a user entity from installing and removing the work applications on the work virtual machine;

managing access to the home applications according to the policy, wherein policy disallows the non-user entity to restrict the user entity from installing and removing the home applications on the home virtual machine;

managing access to shared applications according to the policy, wherein the policy allows the non-user entity to define the shared applications that are utilized by the home operating system and the work operating system;

receiving an indication that an installed application from the work applications or the home applications is paused;

storing a state of the installed application and data associated with the installed application when the installed application was paused in a file; and transmitting the file to an installed application synchronization server computer, the installed application synchronization server computer adapted to provide the file to another device to resume the installed application at the state.

13. The method of claim 12, wherein managing access to the work applications according to the policy comprises permitting the non-user entity to install and remove the work applications on the work virtual machine and restricting the user entity from installing and removing the work applications on the work virtual machine; and wherein managing access to the home applications according to the policy comprises permitting the user entity to install and remove the home applications on the home virtual machine and restricting the non-user entity from installing and removing the home applications on the home virtual machine.

14. The method of claim 13, further comprising:
receiving from the non-user entity a request to remotely access the work virtual machine;
authenticating that the non-user entity is authorized to access the work virtual machine in response to the request; and
responsive to authenticating the non-user entity, permitting the non-user entity to access the work virtual machine and restricting the non-user entity from accessing the home virtual machine.

15. The method of claim 13, wherein the policy specifies that one or more applications retrieved from a privately accessible enterprise application store are permitted to be installed on the work virtual machine and that one or more applications retrieved from a publicly accessible consumer application store are restricted from being installed on the work virtual machine; and wherein the policy specifies that one or more applications retrieved from the publicly accessible consumer application store are permitted to be installed on the home virtual machine and that one or more applications retrieved from the privately accessible enterprise application store are restricted from being installed on the home virtual machine.

16. The method of claim 15, wherein the policy further specifies that a select work application from the work applications installed on the work virtual machine is permitted to be installed on the home virtual machine and that other work applications from the work applications are restricted from being installed on the home virtual machine.

17. The method of claim 12, wherein managing access to the work applications according to the policy comprises permitting data synchronization between the work virtual machine and a work server computer and restricting data synchronization between the work server computer and the home applications and home data; and wherein managing access to the home applications according to the policy comprises permitting data synchronization between the home virtual machine and a home server computer and restricting data synchronization between the home server computer and the work applications and work data.

18. The method of claim 12, wherein providing the gateway between the work virtual machine and the home virtual machine comprises:
detecting whether the multimodal device is within range of a home network;
responsive to detecting that the multimodal devices are within range of the home network, activating the home virtual machine and connecting the multimodal device to the home network;
detecting whether the multimodal device is within range of a work network; and
responsive to detecting that the multimodal device is within range of the work network, activating the work virtual machine and connecting the multimodal device to the work network.

19. The method of claim 12, wherein providing the gateway between the work virtual machine and the home virtual machine comprises:
providing, via the multimodal device, a graphical user interface adapted to request a selection of the work virtual machine or the home virtual machine;
receiving, via the graphical user interface, the selection of the work virtual machine or the home virtual machine;
responsive to receiving the selection of the work virtual machine, activating the work virtual machine and connecting the multimodal device to a work network; and
responsive to receiving the selection of the home virtual machine, activating the home virtual machine and connecting the multimodal device to a home network.

20. The method of claim 12, further comprising:
disabling non-utilized devices sensors in the multimodal device that are not utilized by the work applications and the home applications installed in the multimodal device;
enabling in a reduced power mode a first set of utilized device sensors that are anticipated to be utilized by the work applications and the home applications installed in the multimodal device and are not currently utilized; and
enabling in a full power mode a second set of utilized device sensors that are anticipated to be utilized by the work applications and the home applications installed in the multimodal device and are currently utilized.

21. The method of claim 12, further comprising:
receive a second indication that a streaming application is paused; and
transmit a second state of the streaming application and data associated with the streaming application when the streaming application was paused to a streaming application synchronization server computer, the streaming application synchronization server computer adapted to provide the second state to another device to resume the streaming application at the second state.

22. The method of claim 12, wherein the multimodal device comprises a tablet computer.

23. A tablet computer, comprising:
base hardware comprising a processor and a memory coupled to the processor;

a bare metal hypervisor configured to operate on the base hardware, the bare metal hypervisor adapted to allocate resources of the base hardware between multiple operating systems;

a work virtual machine comprising a work operating system configured to operate on the bare metal hypervisor, the work operating system adapted to run work applications installed on the work virtual machine and shared applications;

a home virtual machine comprising a home operating system configured to operate on the bare metal hypervisor, the home operating system adapted to run home applications installed on the home virtual machine and the shared applications;

an arbitrator operating system configured to operate on the bare metal hypervisor; and a smart arbitrator server configured to operate on the arbitrator operating system, the smart arbitrator server adapted to provide a gateway between the work virtual machine and the home virtual machine, manage access to the work applications according to a policy, wherein the policy allows a non-user entity to restrict a user entity from installing and removing the work applications on the work virtual machine, manage access to the home applications according to the policy, wherein policy disallows the non-user entity to restrict the user entity from installing and removing the home applications on the home virtual machine, manage access to the shared applications according to the policy, wherein the policy allows the non-user entity to define the shared applications, receive an indication that an installed application from the work applications or the home applications is paused;

store a state of the installed application and data associated with the installed application when the installed application was paused in a file; and transmit the file to an installed application synchronization server computer, the installed application synchronization server computer adapted to provide the file to another device to resume the installed application at the state.

24. The tablet computer of claim 23, wherein the work applications are restricted from being installed on the home virtual machine unless specified in the policy; wherein the home applications are restricted from being installed on the work virtual machine; and wherein the shared applications are shared between the home virtual machine and the work virtual machine.

\* \* \* \* \*

UNITED STATES PATENT AND TRADEMARK OFFICE
CERTIFICATE OF CORRECTION

Page 1 of 1

PATENT NO. : 8,813,175 B2
APPLICATION NO. : 13/498424
DATED : August 19, 2014
INVENTOR(S) : Chowdhry It is certified that error appears in the above-identified patent and that said Letters Patent is hereby corrected as shown below:

In the Specification

In Column 1, Line 64, delete "machine Example" and insert -- machine. Example --, therefor.

In Column 2, Line 1, delete "machine Example" and insert -- machine. Example --, therefor.

Signed and Sealed this
Sixth Day of January, 2015

Michelle K. Lee
*Deputy Director of the United States Patent and Trademark Office*